No. 741,493. Patented October 13, 1903.

UNITED STATES PATENT OFFICE.

FERDINAND C. VON HEYDEBRAND UND DER LASA, OF BROOKLYN, NEW YORK.

ARTIFICIAL FUEL.

SPECIFICATION forming part of Letters Patent No. 741,493, dated October 13, 1903.

Application filed July 17, 1903. Serial No. 166,014. (No specimens.)

*To all whom it may concern:*

Be it known that I, FERDINAND C. VON HEYDEBRAND UND DER LASA, a citizen of the United States, and a resident of the city of Brooklyn, State of New York, have invented certain new and useful Improvements in Artificial Fuel; and I do hereby declare the following to be a full, clear, and exact description of the invention, such as will enable others skilled in the art to which it appertains to make and use the same.

My invention relates to artificial fuel, and has for its object to produce a fuel having a high degree of heat efficiency and which burns practically without smoke, without clinkers, and with the least possible residue. To this end the composition I employ has a carbonaceous base compounded with earth, clay, or powdered rock and certain calcareous constituents, said composition being especially adapted for domestic and commercial use.

In carrying out the invention I combine in an intimate admixture granulated or powdered coal, either soft or hard, bituminous or anthracite, peat, lignite, or other industrial carbon, chlorid of lime, oxid or carbonate of lime, such as limestone, and a binder consisting, preferably, of coal-tar pitch or other equivalent bituminous matter and earth or clay, including pulverized rock, if desired. The compound thus formed is molded, compressed, briqueted, or caked in pieces of suitable size and such formation as may be desired to correspond with the several grades of ordinary coal.

The relative proportions of the ingredients may of course be varied within certain limits, and it is therefore to be understood that while the amounts of the several ingredients hereinafter specified constitute an economical and efficient, and therefore preferable composition, yet the proportion may be varied more or less without departing from the invention.

To produce one ton of my improved fuel, I take from twenty to twenty-five pounds of chlorid of lime, about fifty pounds of unburned powdered limestone or oxid of lime, from one hundred to two hundred pounds of coal-tar pitch or other equivalent bituminous matter, using the latter as a binder, from fifty to one hundred pounds of earth or clay, including, if desired, pulverized rock, about seventeen hundred and eighty pounds of carbon, preferably in the form of coal-dust, bituminous or anthracite, peat or lignite. These ingredients after being thoroughly mixed in any suitable machine are finally briqueted or caked in sizes and shapes suitable for the particular use for which they are intended and preferably being graded in sizes corresponding with the several grades of ordinary coal.

Such being the composition of my fuel it is to be noted that the employment of the chlorid of lime is particularly useful, inasmuch as it tends to counteract the deleterious effect of the sulfur given off by the coal in the process of burning. It is also to be noted that the earthy substances are employed only in such proportion as is necessary to prevent the fusion and caking of the particles of coal, so as to enhance the free burning of the same and prevent the usual puffing up or swelling which is incident to the composition of masses of bituminous coal. The oxid or carbonate of lime in the composition plays the important part of not only increasing the heat efficiency of the fuel, but assists the chlorid of lime in the elimination of smoke and also coöperates with the pitch and clay to form an effectual binder.

Having thus described my invention, what I claim is—

1. A composition of matter for artificial fuel, consisting of carbon; earth or clay; chlorid of lime; oxid or carbonate of lime; and a binder; all in about the proportion specified.

2. A composition of matter for artificial fuel, consisting of earth or clay; crushed coal or carbon; coal-tar pitch; chlorid of lime; and oxid or carbonate of lime; all in about the proportions specified.

3. A composition of matter for artificial fuel, consisting of about twenty-five parts of chlorid of lime; fifty parts of unburned, powdered limestone; one hundred parts of coal-tar pitch; fifty parts of earth or clay; and seventeen hundred and eighty parts of carbon, substantially as described.

In testimony whereof I affix my signature in presence of two witnesses.

FERDINAND C. VON HEYDEBRAND
UND DER LASA.

Witnesses:
J. A. GOLDSBOROUGH,
CHARLES LOWELL HOWARD.